US010594997B2

(12) United States Patent
Thompson (10) Patent No.: US 10,594,997 B2
(45) Date of Patent: Mar. 17, 2020

(54) METHOD AND APPARATUS FOR CONVERSION OF DYNAMIC RANGE OF VIDEO SIGNALS (71) Applicant: British Broadcasting Corporation, London (GB)

(72) Inventor: Simon Thompson, London (GB)

(73) Assignee: British Broadcasting Corporation, London (GB)

(*) Notice: Subject to any disclaimer, the term of this patent is extended or adjusted under 35 U.S.C. 154(b) by 0 days.

(21) Appl. No.: 16/095,074

(22) PCT Filed: Apr. 20, 2017

(86) PCT No.: PCT/GB2017/051104
§ 371 (c)(1),
(2) Date: Oct. 19, 2018

(87) PCT Pub. No.: WO2017/182812
PCT Pub. Date: Oct. 26, 2017

(65) Prior Publication Data
US 2019/0116349 A1 Apr. 18, 2019

(30) Foreign Application Priority Data
Apr. 21, 2016 (GB) .................. 1606959.3

(51) Int. Cl.
H04N 11/20 (2006.01)
G06T 5/00 (2006.01)
(Continued)

(52) U.S. Cl.
CPC ............ H04N 11/20 (2013.01); G06T 5/009 (2013.01); H04N 5/202 (2013.01); H04N 9/67 (2013.01);
(Continued)

(58) Field of Classification Search
None
See application file for complete search history.

(56) References Cited

U.S. PATENT DOCUMENTS

2006/0104508 A1   5/2006  Daly et al.
2007/0230802 A1*  10/2007  Kato ............... H04N 19/105
                                                      382/233
(Continued)

FOREIGN PATENT DOCUMENTS

WO    WO 2015/133117 A1   9/2015

OTHER PUBLICATIONS

PCT International Search Report of the ISA for PCT Appl. No. PCT/GB2017/051104 dated Jul. 25, 2017; 4 pages.
(Continued)

Primary Examiner — Michael E Teitelbaum
(74) Attorney, Agent, or Firm — Daly, Crowley, Mofford & Durkee, LLP (57) ABSTRACT A method and device for converting a video signal from a lower dynamic range source to produce a signal usable by target devices of a higher dynamic range comprises converting with a convertor that implements a process in which a received signal is received as a luminance component and separate colour components, A modified luminance component is then produced by applying an expansion function to the luminance component for luminance values above a threshold, applying a gamma function and then applying a scaling function. The modified luminance and separate colour components are then provided as an output signal for display on a target device of a higher dynamic range. The expansion of luminance ensures that the luminance range appropriately matches the range for a target display. By
(Continued)

applying the expansion luminance values above a threshold, values below a threshold can be maintained with appropriate values for display.

20 Claims, 6 Drawing Sheets

(51) Int. Cl.
    *H04N 5/202*         (2006.01)
    *H04N 9/67*          (2006.01)
    *H04N 9/77*          (2006.01)

(52) U.S. Cl.
    CPC ..... *H04N 9/77* (2013.01); *G06T 2207/10024* (2013.01)

(56) References Cited

U.S. PATENT DOCUMENTS

2013/0038790 A1     2/2013     Seetzen et al.
2014/0210847 A1     7/2014     Knibbeler et al.

OTHER PUBLICATIONS

PCT Written Opinion of the ISA for PCT Appl. No. PCT/GB2017/051104 dated Jul. 25, 2017; 10 pages.
PCT International Preliminary Report on Patentablility for PCT Appl. No. PCT/GB2017/051104 dated Oct. 23, 2018; 11 pages.

* cited by examiner

METHOD AND APPARATUS FOR CONVERSION OF DYNAMIC RANGE OF VIDEO SIGNALS

CROSS REFERENCE TO RELATED APPLICATIONS

This application is a U.S. National Stage of PCT application PCT/GB2017/051104 filed in the English language on Apr. 20, 2017, and entitled "METHOD AND APPARATUS FOR CONVERSION OF DYNAMIC RANGE OF VIDEO SIGNALS," which claims priority to United Kingdom application GB1606959.3 filed Apr. 21, 2016 which application is incorporated herein by reference.

BACKGROUND OF THE INVENTION

This invention relates to processing a video signal from a source, to convert from a lower dynamic range such as conventional, standard dynamic range (SDR), to a signal usable by devices having a higher dynamic range.

High Dynamic Range video (HDR) is a new technique which allows the content producer to more accurately reproduce an image without the suppression of highlights usually associated with conventional video. HDR video is currently being debated across the industry, with methods to capture, process, transmit and display HDR video being discussed in standards bodies, trade associations, national regulators and broadcasters globally. Further, manufacturers in the consumer display industry have started to create screens with HDR performance marketed under proprietary names such as eXtended Dynamic Range or Super UHDTV and professional capture devices are being joined by prosumer and handheld capture devices aimed at the early adopter market.

HDR video has a dynamic range, i.e. the ratio between the brightest and darkest parts of the image, of 10000:1 or more. Dynamic range is sometimes expressed as "stops" which is logarithm to the base 2 of the dynamic range. A dynamic range of 10000:1 therefore equates to 13.29 stops. The best modern cameras can capture a dynamic range of about 14 stops and this is improving as technology develops. Conventional televisions (and computer displays) have a restricted dynamic range of about 100:1. This is sometimes referred to as standard dynamic range (SDR).

However, large broadcasters have large archives of SDR video and photographic material, in many cases running into the many millions of hours, which will continue to be used in programmes created for an HDR channel. For example, an historical documentary will continue to use archive footage. For events coverage, it may take many years for a full technical refresh of cameras to occur, so broadcasters may be required to use a mixture of HDR and SDR camera equipment. Similarly, consumers will have many hours of purchased and personal videos stored on tape, optical disk and file server which they will want to continue to watch.

Our earlier patent application UK 2526047 provides an approach to producing a signal viewable on both HDR and non-HDR displays by providing a non-HDR video signal within a Hybrid Log-Gamma (HLG) HDR video signal. This method assumes that the video image should be displayed as it would be on a top-of-the-range non-HDR consumer display and simply positions the non-HDR signal within the HDR container. HLG is summarized in ITU report ITU-R BT.2390-0

At present SDR video may be converted to HDR video through the process of "colour grading" or simply "grading". This is a well-known process, of long heritage, in which the colour and tonality of the image is adjusted to create a consistent and pleasing look. Essentially this is a manual adjustment of the look of the video, similar in principle to using domestic photo processing software to change the look of still photographs. Professional commercial software packages are available to support colour grading. However the process of colour grading requires the use of a skilled operator, is time consuming and, therefore expensive. Furthermore it cannot be used on "live" broadcasts such as sports events.

SUMMARY OF THE INVENTION

We have appreciated the need to provide conversion of video of one dynamic range, such as conventional (SDR) content, in such a way as to improve perceived quality on modern higher dynamic range displays, such as those designated as HDR. We have further appreciated that such conversion should preferably be content independent and reversible.

The invention is defined in the claims to which reference is directed.

In broad terms, the invention provides conversion of a video signal from a source of lower dynamic range, such as a conventional standard dynamic range source, to produce a signal usable by devices of a higher dynamic range involving a function that expands a luminance component in a manner that expands highlights.

An embodiment of the invention provides advantages as follows. The expansion of highlights ensures that the part of the signal range most useful for making use of the HDR dynamic range is made visually prominent without noticeably affecting other parts of the signal range.

Preferably, the expansion of highlights is performed by applying expansion to luminance values above a threshold. In this way, luminance values below the threshold are not noticeably affected by the end to end process when viewed in a final output image.

Preferably, the expansion is a linear function of the input luminance values. Such a function is easily reversible and has been found to be appropriate for a range of archive content.

BRIEF DESCRIPTION OF THE DRAWINGS

The invention will be described in more detail by way of example with reference to the accompanying drawings, in which.

DESCRIPTION OF A PREFERRED EMBODIMENT OF THE INVENTION

The invention may be embodied in a method of processing video signals to convert between a video signal of lower dynamic range to a video signal appropriate for a higher dynamic range display, devices for performing such conversion, transmitters, receivers and systems involving such conversion.

An embodiment of the invention will be described in relation to a processing step which may be embodied in a component within a broadcast chain. The component may be referred to as a pre-processor or converter for ease of discussion, but it is to be understood as a functional module that may be implemented in hardware or software within another device or as a standalone component. The function may be implemented as a 3D look up table. Some background relating to conventional (SDR) video will be repeated for ease of reference.

We will first discuss the historic and practical use of non-linearities in television, by way of background. This includes a discussion of the psycho-visual reasons for the use of non-linearities and the different reasons for non-linearity in analogue and digital systems. We will then discuss a new conversion embodying the invention.

For many years the dynamic range of television displays was limited to about 100:1 by CRT technology. A non-linear "gamma" curve was used to equalize the effect of noise at different brightnesses in analogue TV systems. With the advent of digital TV the same gamma curve also allowed video to be quantized to 8 bits with minimal visible contouring. Modern displays potentially support higher dynamic range images, but remain limited to 100:1 dynamic range by existing infrastructure and standards, particularly for interfaces to TVs. The conventional ITU Recommendation "ITU-R BT.709" gamma curve does not support higher dynamic range (or at least brighter images), even if extended to 12 bits, because of the expectation that the 8 most significant bits are equivalent irrespective of the precision of the signal. Film and cameras have long been able to capture higher dynamic range, with modern film and electronic cameras supporting dynamic range up to approximately 14 stops, i.e. >10000:1.

ITU-R BT.709 defines the non-linearity typically used in cameras which is achieved using an OETF. An OETF is a function defining conversion of a brightness value from a camera to a signal value for subsequent processing. The use of a non-linearity will first be described by way of background. The non-linearity in television was originally introduced to make the effects of noise more uniform at different brightness levels. The CIE (International Committee on Illumination) specifies a function, lightness or L*, which closely approximates human vision's lightness response [CIE 1976]. It is, more or less, a power function with exponent 0.42. As a result of this non-linear visual response the same level of noise is much more visible in dark regions of an image than in bright regions. In an analogue television system, a non-linearity is required to make the subjective effect of noise uniform for regions with different brightness. Hence the signal was non-linearly compressed, with a power law of approximately 0.42, at the camera, and expanded again at the display to produce an approximately linear system overall but with more or less uniform visibility of noise. Early television engineers took advantage of the non-linear characteristic of CRT displays achieve this, since the non-linearity of a CRT closely approximates a power law of 2.4 (and 2.4 is approximately the reciprocal of 0.42). These power laws are commonly referred to as gamma laws. So the gamma of a CRT display is about 2.4 (and is specified in ITU Recommendation ITU-R BT.1886), and the overall gamma of the system described in this paragraph is 0.42× 2.4, which is approximately unity.

In practice a power law with exponent 0.5 (i.e. square root) is ubiquitously used in the camera. Combined with a display gamma of 2.4 this gives an overall system gamma of 1.2. This deliberate overall system non-linearity is designed to compensate for the subjective effects of viewing pictures in a dark surround and at relatively low brightness. This compensation is sometimes known as "rendering intent". The power law of 0.5 is specified in ITU-R BT.709 and the display gamma of 2.4 is specified in ITU-R BT.1886.

As noted above, the compression at the camera is achieved using an OETF. The specific opto-electronic transfer function (OETF) is defined "ITU-R BT.709" as:

$$V = \begin{cases} 4.5L & \text{for } 0 \leq L < 0.018 \\ 1.099L^{0.45} - 0.099 & \text{for } 0.018 \leq L \leq 1 \end{cases}$$

where:
L is luminance of the image $0 \leq L \leq 1$
V is the corresponding electrical signal. The value V referred to a voltage when first defined in the analogue world, but now generally refers to a signal value, whether analogue or digital. Note that although the ITU-R BT.709 characteristic is defined in terms of the power 0.45, overall, including the linear portion of the characteristic, the characteristic is closely approximated by a pure power law with exponent 0.5. The 4.5 L part of the conversion is provided to suppress camera noise.

With the above background, an embodiment of the invention will now be described. The arrangement comprises a converter for receiving SDR video and producing a signal displayable on an HDR display with characteristics such that the image appears appropriate, not withstanding that the signal is not actually an HDR signal. The input to the converter is a signal, such as RGB, from an SDR device. This is a signal in which each component has a range 0 to 1, such as in accordance with ITU-R BT.709. The output of the converter looks like an RGB signal that has been provided according to an HDR signal range and this is why it can be correctly viewed on an HDR display. However, this signal is actually still only providing an SDR signal and no information has been created, it is simply a different signal in RGB format with each component having a signal range less than 0 to 1 (i.e. not the full HDR range). Optionally, the colour space may also be converted between ITU-R BT.709 and Recommendation ITU-R BT. 2020 in the path to the HDR display as discussed later.

The purpose of providing a signal range less than 0 to 1 for the converted lower dynamic range signal may be understood by considering a true HDR signal and how this is represented on an HDR display. An HDR display has an output range that is much greater than that of an SDR display and expects to receive an HDR signal range 0 to 1 with the upper value being the brightest that the display can provide. Accordingly, if an SDR signal is provided directly to an HDR display without any conversion, the HDR display will render the value 1 at the highest HDR level, even though it was only originally intended to be a lower light level. This causes two problems. First, the overall appearance may appear unnatural and overly bright. Second, because the original signal was digitally quantized, the effective stretching of the signal over wider light range may make the quantisation levels visible as banding in the image.

The arrangement provides an expansion function applied to the luminance component of the image only, whilst leaving, as far as possible, the colours unchanged. This can be achieved by converting the input signal such as in RGB, YCbCr or other format into a subjective colour space that separates the brightness and colour aspects of the image. A suitable colour space is Yu'v', which is strongly related to the CIE 1976 L*u*v* colour space. The Y component in Yu'v' is simply the Y component from CIE 1931 XYZ colour space, from which L* is derived in CIE 1976 L*u*v*. The u'v' components, which represent colour information independent of brightness, are simply the u' & v' components defined in CIE 1976 L*u*v* as part of the conversion from CIE 1931 XYZ. Other similar colour spaces are known in the literature and might also be used in this invention.

Figure 1:
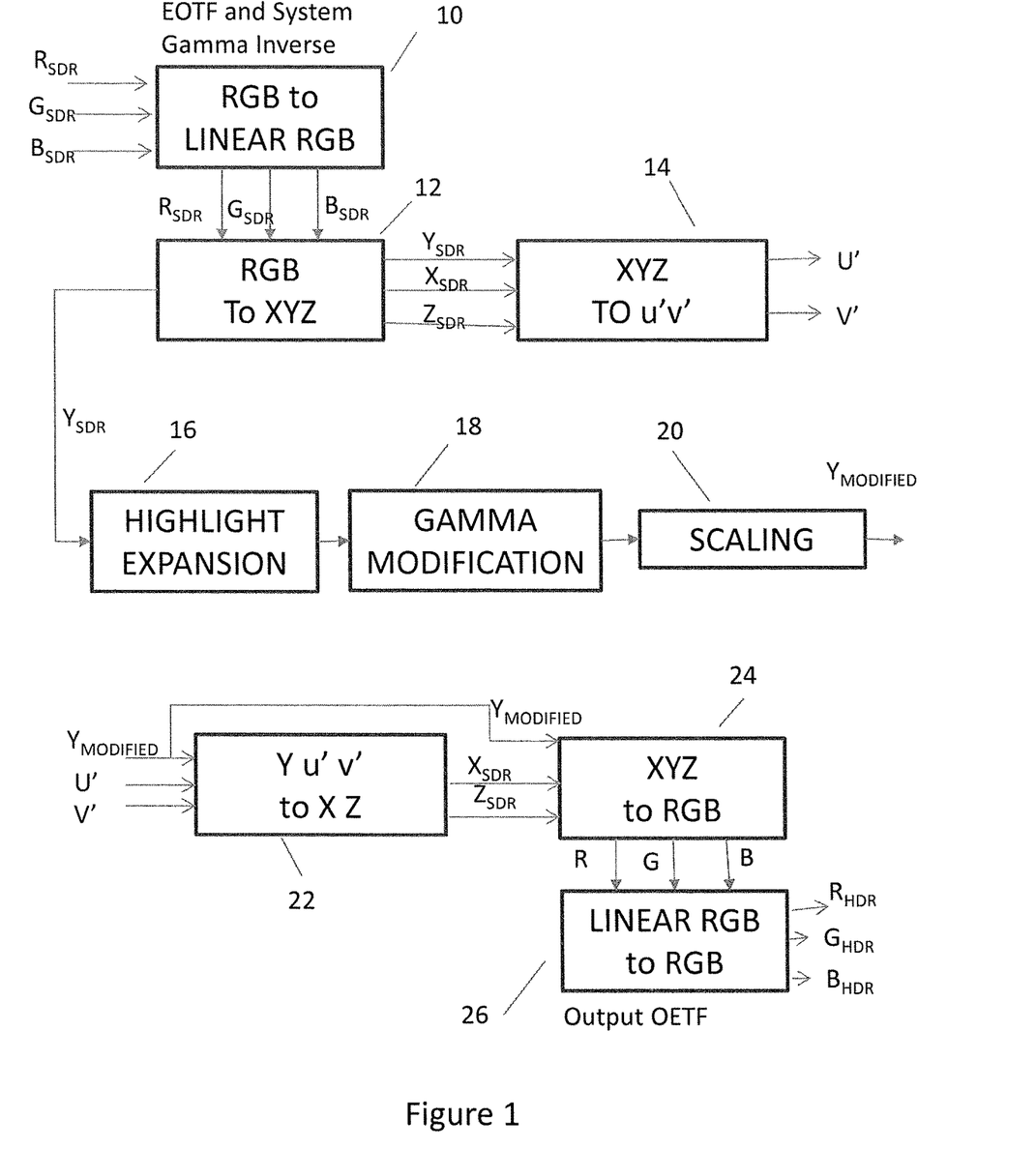
FIG. 1 shows the functional components of a converter according to an embodiment.

FIG. 1 shows the main functional components of the converter which takes as an input a signal such as RGB that has been provided using an SDR OETF and provides as an output a signal such as RGB capable of being viewed on an HDR display or which can be processed using a reverse process to generate an SDR signal for presentation on an SDR display. The received RGB signal may have been provided using any appropriate SDR OETF. The converter either implements the steps described below, or may provide an equivalent to those steps in a single process, such as using a 3D-LUT.

In order to convert the input RGB to Yu'v' the signal is converted to CIE 1931 XYZ. Because the input signal is derived from linear light via an OETF (non-linear) the RGB components are first transformed back to linear, by applying the EOTF for the originally intended display to the RGB components, followed by removal of system gamma of 1.2 on the luminance component, in RGB to linear module 10. The EOTF for the originally intended display may be, for example, according to ITU-R BT 1886. The conversion to XYZ may then simply be performed, as is well known in the literature, by pre-multiplying the linear RGB components (as a vector) by a 3×3 conversion matrix. The RGB to XYZ converter 12 receives the linear RGB signals and converts to XYZ format.

At this stage, the XYZ signals represent the full dynamic range of linear RGB SDR signals. An XYZ to u'v' converter 14 receives the XYZ signals and provides an output in u'v' colour space.

Separately the luminance component Y is provided to an expander comprising an expansion block 16, a gamma modification block 18 and a scaling block 20 which together provide a function to expand the Y signal to produce a modified Y component.

The expansion block operates to multiply luminance values above a threshold by a factor. This is preferably a linear expansion. The gamma modification is then applied to account for the subsequent scaling step. This is a power law. Lastly, the scaling step is applied to the whole range of luminance to bring the values into a range that is appropriate for display of the original image on an HDR display and within the allowed signal range of HDR standards.

An example calculation performed by the expansion block is as follows. First, a breakpoint is determined for the luminance value above which the luminance will be expanded and below which the luminance values will not be expanded. The breakpoint may be determined by subjective testing with users or by other means. The breakpoint variable is "BPscene". Then, to expand the highlights the following function is used:

if $(Y>BP\text{scene})$ $Y=Y-BP\text{scene};$ $Y=Y^*\text{highlightScale};$ $Y=Y+BP\text{scene};$ The values of the breakpoint "BPscene" and "highlightScale" may be determined by subjective testing or other means as noted above, but examples are 0.64 and 2.5 respectively. These may be user controllable variables that may be adjusted for a given video conversion.

Next, a gamma modifier is applied to ensure that, when viewed on an HDR screen, the signal still appears to have the required SDR system gamma. For example, if a target HDR screen has a system gamma of 1.45 and SDR has a system gamma of 1.2 (as discussed earlier), a gamma modification of 1.2/1.45=0.83 could be used. Gamma modification is applied as follows:

$Y=Y^{modifyingGamma}$

An example value for the variable "modifyingGamma" is 0.83.

Last, the scaling step is applied:

$Y=Y^*\text{scalingFactor};$

An example value for the variable "scalingFactor" is 2.011. The values for the variables modifyingGamma and scalingFactor may also be user selectable or otherwise defined for a given conversion.

The modified luminance component Y and u'v' are then converted back to RGB signals via a Y u'v' to XZ converter 22 and an XYZ to RGB converter 24 providing an output signal RGB. This is a linear RGB signal and so is then converted to a "gamma corrected" non-linear format using an OETF 26 for the display so that it is displayable on an HDR display. The OETF module 26 implements an appropriate OETF depending upon the target HDR arrangement. It should be recalled that the purpose of the converter shown in FIG. 1 is to provide a signal that is close to an HDR signal. Accordingly, the preferred OETF implemented in the linear to RGB OETF converter 26 will bear this in mind. Taken overall, the converter shown in FIG. 1 has received an SDR signal provided from a camera that used an SDR OETF, removed that OETF by applying a display EOTF on RGB and applying an inverse of the SDR system gamma on luminance and then the subsequent processing steps described above and then at the output applied an OETF for an HDR display. The signal is therefore similar at the output as would have been provided from an HDR camera using an OETF, but importantly the signal still contains the full information that was provided by the SDR camera and so may be reversed to provide an SDR signal.

The preferred implementation of the converter is preferably using a 3D look-up table (3D-LUT). In this arrangement, a signal such as an RGB of one dynamic range may be directly rendered appropriate for a display of higher dynamic range by lookup in the 3D-LUT. The output comprises an RGB signal that originated from an SDR RGB signal but which is usable within HDR systems. Moreover, the reverse process may be operated to recover an SDR RGB signal by splitting into components as before and operating a reverse of the expansion curves. The reverse functionality may also be implemented by using a 3D-LUT to convert directly from a modified signal such as an RGB signal for display on an HDR display back to the original RGB signal.

Figure 2:
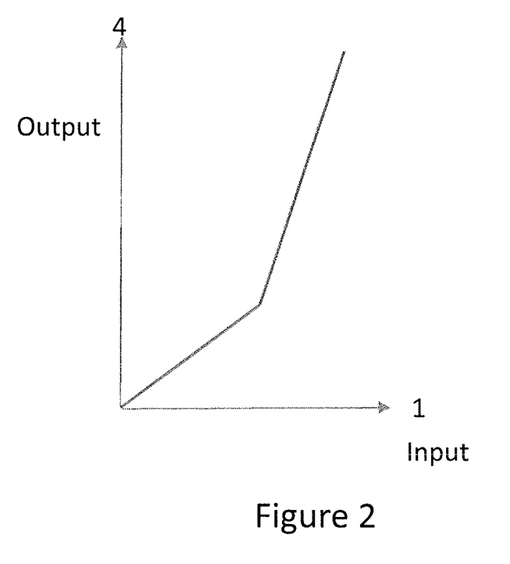
FIG. 2 is a schematic diagram of an expansion function implemented by a converter.

FIG. 2 shows schematically an example expansion function that may be used in the expansion block applied to the luminance component. In this example, a linear expansion is applied to input Y values above a threshold. The input range is thereby expanded from values 0 to 1 to values 0 to higher than 1 but only affecting luminance values above the threshold. The choice of expansion is based on subjective testing or similar means and will always be chosen to avoid clipping in the target signal range.

The choice of variables above if the scaling factor were set to 1 would typically give a peak output of 300 cd/m$^2$ on a 4000 cd/m$^2$ peak reference monitor (which is as bright as we expect to see HDR screens for the foreseeable future). With the scaling factor set to 2.5, the peak output would be 505 cd/m$^2$.

A summary of example values for the above variables are given below.
Breakpoint=0.64
Highlight Expansion=1.0 (i.e. no expansion)
Modifying Gamma=0.83
Scaling Factor=2.011
Max Luminance=300 cd/m$^2$
Breakpoint=0.64
Highlight Expansion=2.5
Modifying Gamma=0.83
Scaling Factor=2.011
Max Luminance=505 cd/m$^2$ FIGS. 3 to 9 provide graphs to assist in understanding the benefit provided by a converter embodying the invention. These graphs step through the functional stages to show the end to end effect on one channel of an RGB signal of lower dynamic range modified for display on a display of higher dynamic range.

Figure 3:
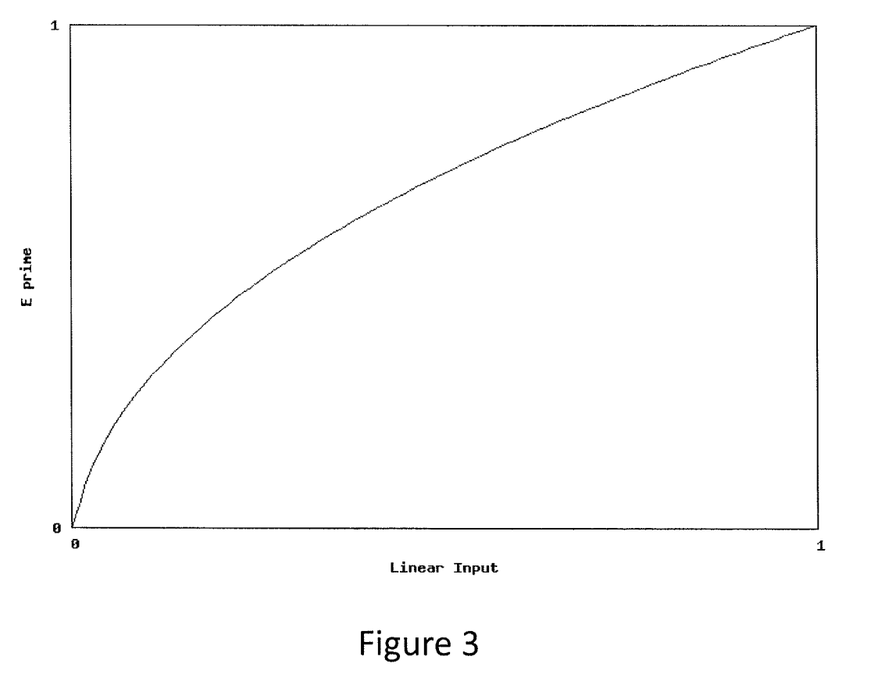
FIG. 3 shows an example input signal with an SDR OETF applied to an RGB signal.
Figure 4:
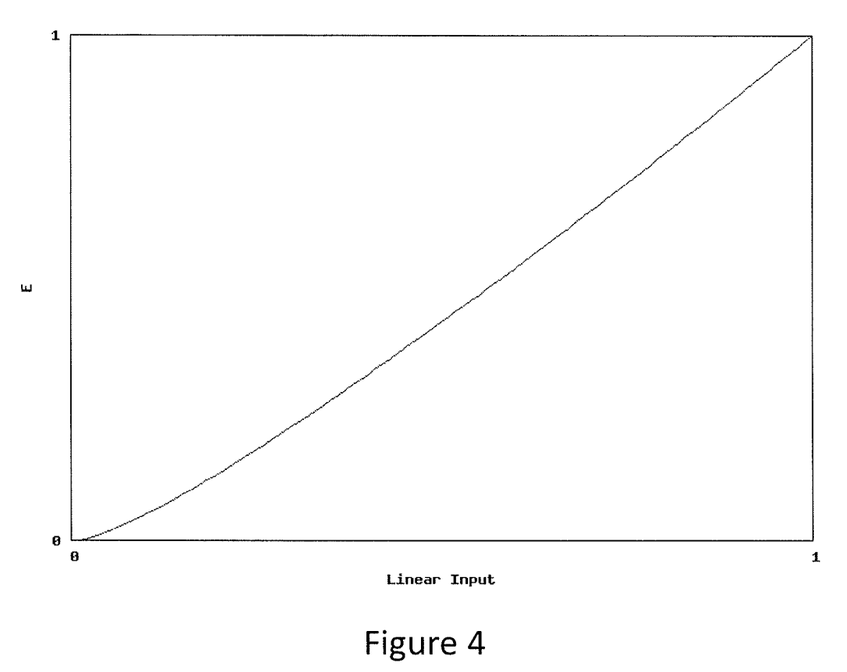
FIG. 4 shows the signal of FIG. 3 after conversion with the SDR EOTF.
Figure 5:
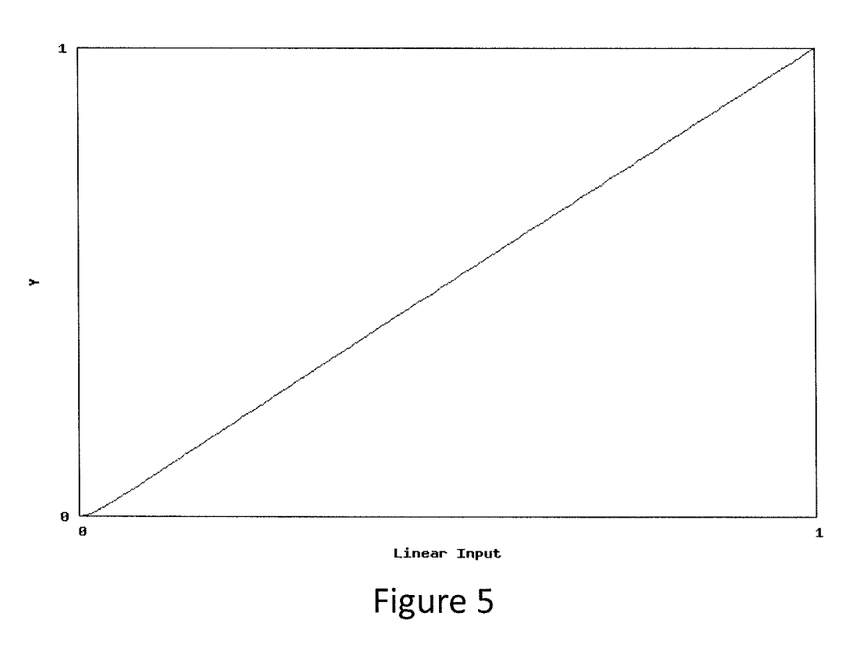
FIG. 5 shows the signal of FIG. 4 after system gamma correction.

FIGS. 3 to 5 show the conversion from RGB to linear luminance. FIG. 3 shows an example signal encoded according to ITU-R BT.709. This shows how a linear light input in the range 0 to 1 is encoded onto one channel E' of signal range 0 to 1. The channel E' represents any of R', G' or B'. FIG. 4 shows the result of applying a BT.1886 Reference EOTF on the RGB to linear RGB block 10. As can be seen, the signal is now nearly linear but still has a power law shape, this being the overall system gamma. FIG. 5 shows the final output of the RGB to linear RGB block after gamma removal and conversion to luminance Y in RGB to XYZ block 12. As can be seen, the luminance Y is linearly related to the scene light.

Figure 6:
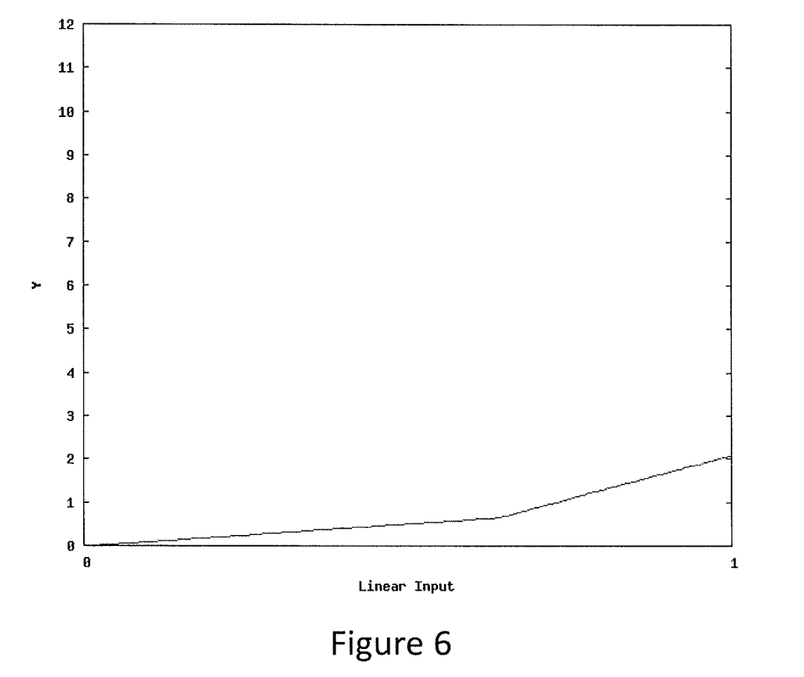
FIG. 6 shows the signal of FIG. 5 after linear expansion.
Figure 7:
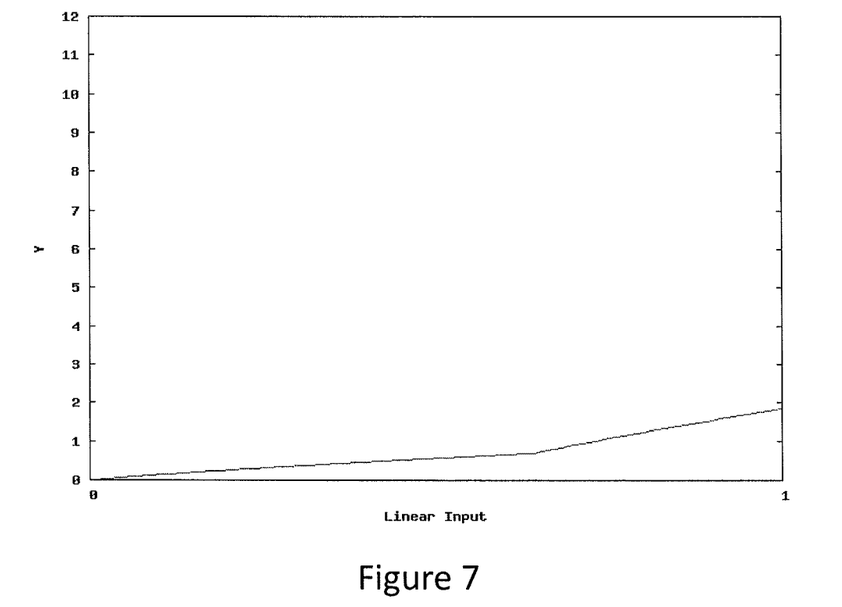
FIG. 7 shows the signal of FIG. 6 after gamma correction.
Figure 8:
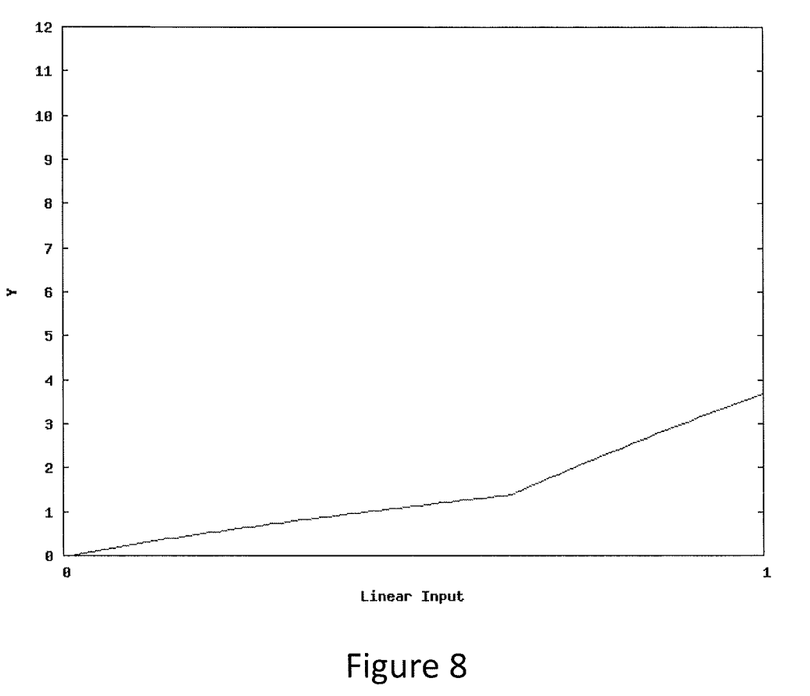
FIG. 8 shows the signal of FIG. 7 after scaling.

FIGS. 6 to 8 show the respective steps of highlight expansion block 16, gamma modification block 18 and scaling block 20. FIG. 6 shows the result of applying the expansion block 16. As shown, the linear luminance input above a threshold is multiplied so that values of Y are higher than 1. The scaling of the graph is arbitrary, but chosen to match the following stages. FIG. 7 shows the result of applying the gamma modification block 18. The system gamma required for displaying the image is related to the brightness of the display. For example, to match the SDR system gamma of 1.2 to an HDR system with a system gamma of 1.45, a modifying gamma of 1.2/1.45 could be used. FIG. 8 shows the output of the scaling block 20. The scaling is used to generate a signal in the correct range for the following HDR OETF. In this example a range of 0-12 is used. This is suitable for the chosen output OETF such as the HLG OETF listed in ITU-R BT.2390 noted earlier.

Figure 9:
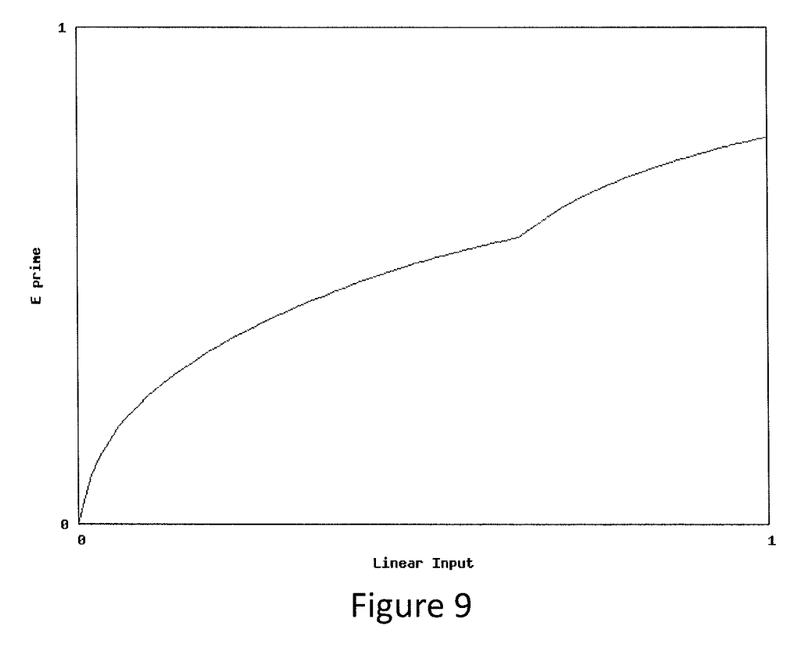
FIG. 9 shows the signal of FIG. 8 after conversion to RGB and application of an HDR OETF (HLG)

FIG. 9 shows the final result for one channel E' when converted back to RGB and having the HLG OETF applied as per ITU-R BT.2390. As before, E' represents any one of R', G' or B'. Some features are to be noted. First, the modified SDR signal does not cover the full range (0-1) of the HDR signal. In consequence, the maximum brightness of the HDR display will not be used. This is as expected so as to avoid highlights from the original signal appearing overly bright on the HDR display. Second, the bottom part of the curve has a similar shape to the original SDR OETF so that relative colours and brightness of dark and mid tones are unaffected. Further, the upper part of the curve shows the relative expansion of the highlights but without using the full range of the HDR channel so as to avoid overly bright highlights or banding effects.

Figure 10:
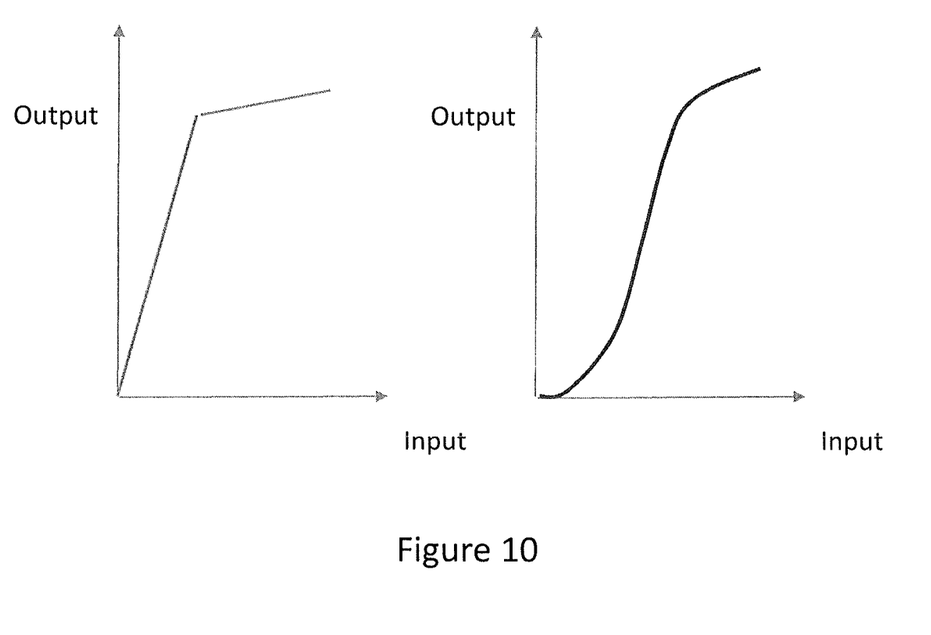
FIG. 10 is a diagram showing known "knee" and "S" curves.

FIG. 10 shows a camera "knee" function and a film curve by way of explanation as to why the highlight expansion of the embodiment provides appropriate results.

The systems in use today for standard and high definition television have a smaller dynamic range than traditional cellulose film stock, only being able to represent six stops compared to over ten for low-speed film. In an attempt to rectify this, camera manufacturers have traditionally used a camera "knee", a non-linearity in the transfer function which captures higher levels of highlights and compresses them to be within the dynamic range envelope of the video system. The result—details are maintained in the highlights but shown at too low a brightness relative to the shadows and mid-tones. A typical response of a camera knee circuit is shown in FIG. 10 left. The break point and the highlight compression slope are chosen by the camera user. Similar effects occur when using film stock due to the non-linear nature of the chemical reaction caused by light, see FIG. 10 right.

As can be seen in both the use of a camera "knee" and a film "S curve", the highlights are already artificially compressed and so applying an expansion to the highlights for the purposes of SDR to HDR conversion is, we appreciated, likely to produce appropriate results in most circumstances.

Informal expert testing of the test sequences has shown that there is a perceptual quality increase created by highlight expansion, that it is possible to expand highlights too far and cause objectionable artifacts and that, for footage that has no camera knee but has been colour graded to compress highlights, highlight expansion of footage with no camera knee also increases perceptual quality. Values for the luminance threshold and amount of expansion may be determined by subjective testing using feedback from test viewings or other means.

Various further advantages of the arrangements described may be understood by considering that the expansion function described is applied to the luminance component. As described in relation to FIG. 5 above, the luminance is linearly related to scene light. The operations performed are therefore in relation to scene referred signals, that is relative luminance values. This may be contrasted with other arrangements that use display referred Luma values (non-linear, such as gamma applied display light) and therefore require knowledge of the intended target display. It is the fact that other arrangements use display referred signals that requires knowledge of the intended target display.

The difference between use of luminance and use of Luma is an important one to ensure that there are no hue and colour saturation distortions. As luma values are derived from gamma applied non-linear R, G, B signals, they carry some colour information. Thus adjusting the luma signal also alters the colour. Luminance values are derived from linear light signals, and are independent of the colour signal. They can therefore be adjusted without affecting the appearance of colour within a scene.

The conversion is content independent because the functions that are used are pre-defined and do not in any way rely on the signal content. The conversion is reversible because the functions are known and mathematically reversible. The functions are monotonic and content independent and so it is computationally simple to reverse the effects of the functions. Accordingly, the output may be reverted to a signal appropriate for an SDR display using the reverse process without any extra information being required.

The final step of providing the modified luminance component and separate colour components to provide an output signal for display on the target device of a higher dynamic range includes applying an OETF. This step converts from scene-light to a non-linear signal representing the scene. However, the signal remains a scene referred signal and knowledge of the target display is not required.

The invention claimed is:

1. A method of processing a video signal from a lower dynamic range source to produce a signal usable by target devices of a higher dynamic range, comprising receiving the video signal from the source and converting using a converter that implements the following function as separate steps or a single process using a 3D look-up table (3D-LUT):
   providing the received signal in a colour space that separates the brightness and colour aspects of an image to provide a luminance component and separate colour components;
   producing a modified luminance component by applying an expansion function to the luminance component for luminance values above a threshold, applying a gamma function to the output of the expansion function and applying a scaling function to the output of the gamma function; and
   providing the modified luminance component and the separate colour components to provide an output signal for display on the target device of the higher dynamic range.

2. A method according to claim 1, wherein the expansion function is a linear function.

3. A method according to claim 1, wherein the step of providing the received signal in a colour space that separates the brightness and colour aspects of an image to provide a luminance component and separate colour components comprises applying a display electro-optical transfer function (EOTF).

4. A method according to claim 1, wherein the step of providing the modified luminance component and separate colour components to provide the output signal comprises applying an electro-optical transfer function (OETF) appropriate for the target devices of higher dynamic range.

5. A method according to claim 1, wherein the converter further removes a system gamma by applying an inverse system gamma on the luminance component.

6. A method according to claim 1, wherein the video signal from the source is in an RGB or YCbCr format and providing the video signal in a colour space that separates the brightness and colour aspects of an image to provide a luminance component and separate colour components comprises conversion from the RGB or YCbCr format.

7. A method according to claim 1, wherein providing the modified luminance component and separate colour components as an output signal comprises conversion to RGB or YCbCr.

8. A method according to claim 7, wherein the conversion to RGB or YCbCr comprises providing the output substantially according to ITU-R BT.709 or ITU-R BT.2020.

9. A method according to claim 1, wherein providing the received signal in a colour space that separates the brightness and colour aspects of an image to provide a luminance component and separate colour components comprises converting to CIE 1931 Y plus CIE 1976 u'v' components.

10. A converter for converting a video signal from a lower dynamic range source to produce a signal usable by target devices of a higher dynamic range, the converter comprising:
   a means for providing a video signal, received from a source, in a colour space that separates the brightness and colour aspects of an image to provide a luminance component and separate colour components;
   a means for producing a modified luminance component by applying an expansion function to the luminance component for luminance values above a threshold, applying a gamma function to the output of the expansion function and applying a scaling function to the output of the gamma function; and
   a means for providing the modified luminance component and separate colour components to provide an output signal for display on the target device of a higher dynamic range,
   wherein one or more of the converter means is implemented using a 3D look-up table (3D-LUT).

11. A converter according to claim 10, wherein the expansion function is a linear function.

12. A converter according to claim 10, wherein the step of providing the video signal in a colour space that separates the brightness and colour aspects of an image to provide a luminance component and separate colour components comprises applying a display electro-optical transfer function (EOTF).

13. A converter according to claim 10, wherein the step of providing the modified luminance component and separate colour components to provide an output signal comprises applying an electro-optical transfer function (OETF) appropriate for the target devices of higher dynamic range.

14. A converter according to claim 10 comprising a means for removing a system gamma by applying an inverse system gamma on the luminance component.

15. A converter according to claim 10, wherein the video signal from the source is in an RGB or YCbCr format and providing the video signal in a colour space that separates the brightness and colour aspects of an image to provide a luminance component and separate colour components comprises conversion from the RGB or YCbCr format.

16. A converter according to claim 10, wherein providing the modified luminance component and separate colour components as an output signal comprises conversion to RGB or YCbCr.

17. A converter according to claim 16, wherein the conversion to RGB or YCbCr comprises providing the output substantially according to ITU-R BT.709 or ITU-R BT.2020.

18. A converter according to claim 10, wherein providing the video signal in a colour space that separates the brightness and colour aspects of an image to provide a luminance component and separate colour components comprises converting to CIE 1931 Y plus CIE 1976 u'v' components.

19. A converter according to claim 10, wherein the converter comprises a 3D-LUT.

20. A studio chain for converting a video signal from a lower dynamic range source to produce a signal usable by target devices of a higher dynamic range, the studio chain comprising:

a means for providing a video signal, received from a source, in a colour space that separates the brightness and colour aspects of an image to provide a luminance component and separate colour components;
a means for producing a modified luminance component by applying an expansion function to the luminance component for luminance values above a threshold, applying a gamma function to the output of the expansion function and applying a scaling function to the output of the gamma function; and
a means for providing the modified luminance component and separate colour components to provide an output signal for display on the target device of a higher dynamic range,
wherein one or more of the converter means is implemented using a 3D look-up table (3D-LUT).

* * * * *